(12) United States Patent
Huang et al.

(10) Patent No.: US 12,710,874 B2
(45) Date of Patent: Aug. 18, 2026

(54) MEMORY DEVICE AND OPERATION METHOD THEREOF

(71) Applicant: MACRONIX INTERNATIONAL CO., LTD., Hsinchu (TW)

(72) Inventors: Shih-Chang Huang, Magong City (TW); Han-Sung Chen, Hsinchu City (TW); Chin-Hung Mi, New Taipei City (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 239 days.

(21) Appl. No.: 18/652,875

(22) Filed: May 2, 2024

(65) Prior Publication Data

US 2025/0341965 A1 Nov. 6, 2025

(51) Int. Cl.
*G06F 3/06* (2006.01)

(52) U.S. Cl.
CPC .......... *G06F 3/0611* (2013.01); *G06F 3/0656* (2013.01); *G06F 3/0659* (2013.01); *G06F 3/0679* (2013.01); *G06F 2212/7203* (2013.01)

(58) Field of Classification Search
CPC .... G06F 3/0611; G06F 3/0656; G06F 3/0659; G06F 3/0679; G06F 2212/7203; G11C 16/06; G11C 16/08; G11C 16/30
See application file for complete search history.

(56) References Cited

U.S. PATENT DOCUMENTS

| | | | | |
|---|---|---|---|---|
| 8,347,042 B2 * | 1/2013 | You | ........................ | G11C 16/10<br>711/144 |
| 10,026,473 B2 * | 7/2018 | Yoon | ........................ | G11C 7/08 |
| 11,474,939 B2 | 10/2022 | Park | | |
| 2008/0235442 A1 | 9/2008 | Chae | | |

FOREIGN PATENT DOCUMENTS

| | | |
|---|---|---|
| TW | 200632919 A | 9/2006 |

* cited by examiner

*Primary Examiner* — Kalpit Parikh
(74) *Attorney, Agent, or Firm* — McClure, Qualey & Rodack, LLP

(57) ABSTRACT

An operation method for a memory device comprises: starts a first operation cycle after receiving a first operation command, the first operation cycle including a voltage set period, a first operation set period, a first operation executing period and a first operation recovery period; when a second operation command is received by the memory device before the end of the first operation recovery period, starts a second operation cycle directly after the end of the first operation recovery period. The second operation cycle includes a second operation set period, a second operation executing period and a second operation recovery period, and the second operation set period is adjacent to the first operation recovery period. The cache is switched to a ready status from a busy status while starting the first operation recovery period and the second operation recovery period, such that data in the cache is accessible.

18 Claims, 7 Drawing Sheets

FIG. 7
700
700a
700b
700c
CMD1
CMD2
DOUT1
DOUT2
P11
P12
P13
P131
P132
DL2CDL
P14
P22
P23
P231
P232
P24
CS
S1
SL
SH
740
741
742
C1
C2
RT1
RT2

MEMORY DEVICE AND OPERATION METHOD THEREOF

BACKGROUND OF THE INVENTION

Field of the Invention

The present disclosure is directed to semiconductor devices, e.g., operating cache in semiconductor devices.

Description of the Related Art

Semiconductor devices, e.g., memory devices, are becoming smaller and faster. Many applications request to support higher read frequencies. However, to ensure successful read, a read control timing setting has to be aligned with a worst read performance, which can suppress using a higher read frequency for a higher read performance.

SUMMARY OF THE INVENTION

The invention is directed to a method of methods, devices, systems and techniques for managing read timing in semiconductor devices, e.g., non-volatile memory devices such as flash memory devices.

According to a first aspect of the present disclosure, an operation method for a memory device is provided. The operation method comprises: starts a first operation cycle in the memory device after the memory device receiving a first operation command, wherein the first operation cycle includes voltage set period, a first operation set period, a first operation executing period and a first operation recovery period; switches to a busy status of the cache while starting the voltage set period; receives data by the cache in the first operation period; and switches to a ready status from the busy status of the cache while starting the first operation recovery period, such that data in the cache is accessible during the ready status. When the second operation command is received by the memory device before the end of the first operation recovery period, the memory device starts a second operation cycle directly after the end of the first operation recovery period, which the second operation cycle includes a second operation set period, a second operation executing period and a second operation recovery period, and the second operation set period is adjacent to the operation recovery period. The busy status of the cache is switched to the ready status from the busy status while starting the second operation recovery period, such that data in the cache is accessible.

In some embodiments, when the second operation command is received after the end of the first operation recovery period, the memory device restarts the first operation cycle after receiving a second operation command and the cache is switched to the busy status. The period of the second operation cycle is shorter than the period of the first operation cycle.

In some embodiments, the cache corresponds to a ready/busy indication signal including a first level indicating the ready status of the cache and a second level indicating the busy status of the cache. Falling edges from the first level switching to the second level of the ready/busy indication signal corresponds to the start of the voltage set period and the end of the first operation command, or corresponds to the end of the second operation command during the first operation recovery period, and rising edges from the second level switching to the first level of the ready/busy indication signal corresponds to the start of the first operation recovery period and the start of the second operation recovery period.

In some embodiments, the time period of a first operation current of the memory device corresponds to the time period of the first operation cycle. When the second operation command is received before the end of the first operation recovery period, the time period of a stand-by current of the memory device corresponds to the time period between the end of the first operation recovery period and the end of the second operation command. The time period between two adjacent falling edges of the ready/busy indication signal corresponds to the sum of time periods of the first operation current and the stand-by current of the memory device.

In some embodiments, when the second operation command is received before the end of the first operation recovery period, the cache switches to the busy status after receiving the second operation command. The time period of a second operation current of the memory device corresponds to the time period of the second operation cycle, and the falling edge of the ready/busy indication signal corresponds the end of the second operation command during the first operation recovery period, such that the time period between two adjacent falling edges of the ready/busy indication signal is shorter than time periods of the first operation current of the memory device.

In some embodiments, the memory device is a NAND memory device including a page buffer, and the first operation cycle further includes a first page buffer to cache period between the first operation executing period and the first operation recovery period, which the first page buffer to cache period is configured to operate data transferring between the page buffer and the cache.

In some embodiments, the NAND memory device includes a memory cell array, and the first operation command includes a first read command. The first operation executing period at least includes a first read executing period and a second read executing configured to respectively read data from the memory cell array to the page buffer, and data of the cache outputs during the first operation recovery period.

In some embodiments, the NAND memory device includes a memory cell array, and the second operation command includes a second read command. The second operation cycle further includes a second page buffer to cache period between the second operation executing period and the second operation recovery period, which the second page buffer to cache period is configured to operate data transferring between the page buffer and the cache of the NAND memory device.

In some embodiments, the second operation executing period at least includes a third read executing period and a fourth read executing period configured to respectively read data from the memory cell array to the page buffer, and data of the cache outputs during the second operation recovery period.

In some embodiments, the time period of a first operation current of the NAND memory device corresponds to the time period of the first operation cycle. When the second read command is received before the end of the first operation recovery period, one of the falling edges of the ready/busy indication signal corresponds to the end of the second read command during the first operation recovery period, such that the first operation current still occurs in a gap between the falling edge of ready/busy indication signal and the end of the first operation recovery period, wherein the first operation current is equal to and larger than a preset value.

In some embodiments, the memory device is a NOR memory device including a register, and the first operation command includes a first read command. The first operation executing period is configured to read data from the register to the cache of the NOR memory device and data in the cache outputs during the first operation recovery period.

In some embodiments, the memory device is a NOR memory device including a register, and the second operation command includes a second read command. The second operation executing period is configured to read data from the register to the cache of the NOR memory device and data in the cache outputs during the second operation recovery period.

In some embodiments, the first operation command includes a first write command and data in the cache is written into the memory device during the first operation recovery period. The second operation command includes a second write command and data in the cache is written into the memory device during the second operation recovery period.

According to a second aspect of the present disclosure, a memory device is provided. The memory device, comprises: a memory cell array is configured to store data; a control circuit is coupled to the memory cell array, and the control circuit includes a command interface and an operation flow controller; and a cache is coupled to the memory cell array and the control circuit. After the control circuit receiving a first operation command via the command interface, the control circuit control the memory device starting a first operation cycle including a first voltage set period, a first operation set period, a first operation executing period and a first operation recovery period. The operation flow controller controls the cache to operate the following procedures: switches to a busy status of the cache while starting the voltage set period; receives data by the cache in the first operation period; and switches to a ready status from the busy status of the cache while starting the first operation recovery period, such that data in the cache is accessible during the ready status. When the second operation command is received by the command interface before the end of the first operation recovery period, the control circuit controls the memory device to start a second operation cycle directly after the end of the first operation recovery period, which the second operation cycle includes a second operation set period, a second operation executing period and a second operation recovery period, and the second operation set period is adjacent to the operation recovery period. The busy status of the cache is switched to the ready status from the busy status by the operation flow controller while starting the second operation recovery period, such that data in the cache is accessible.

In some embodiments, the memory device is a NAND memory device further comprises: a page buffer is coupled between the memory cell array and the cache; and a data I/O (input/output) circuit is coupled to the cache. The first operation command includes a first read command.

In some embodiments, the first operation cycle further includes a first page buffer to cache period between the first operation executing period and the first operation recovery period, which the first page buffer to cache period is configured to operate data transferring between the page buffer and the cache.

In some embodiments, the first operation executing period at least includes a first read executing period and a second read executing configured to respectively read data from the memory cell array to the page buffer, and data of the cache outputs to the data I/O circuit during the first operation recovery period.

In some embodiments, the second operation command includes a second read command. The second operation cycle further includes a second page buffer to cache period between the second operation executing period and the second operation recovery period, which the second page buffer to cache period is configured to operate data transferring between the page buffer and the cache.

In some embodiments, the second operation executing period at least includes a third read executing period and a fourth read executing configured to respectively read data from the memory cell array to the page buffer, and data of the cache outputs to the data I/O circuit during the second operation recovery period.

In some embodiments, the time period of a first operation current of the NAND memory device corresponds to the time period of the first operation cycle. When the second read command is received before the end of the first operation recovery period, a falling edge of a ready/busy indication signal corresponds to the end of the second read command during the first operation recovery period, such that the first operation current still occurs in a gap between the falling edge of ready/busy indication signal and the end of the first operation recovery period, wherein the first operation current is equal to and larger than a preset value.

Embodiments of the above techniques include methods, systems, circuits, computer program products and computer-readable media. In one example, a method can include the above-described actions. In another example, one such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above-described action The above and other aspects of the invention will become better understood with regard to the following detailed description of the preferred but non-limiting embodiment(s). The following description is made with reference to the accompanying drawings.

BRIEF DESCRIPTION OF THE DRAWINGS

Like reference numbers and designations in the various drawings indicate like elements. It is also to be understood that the various exemplary implementations shown in the figures are merely illustrative representations and are not necessarily drawn to scale.

DETAILED DESCRIPTION OF THE INVENTION

Embodiments of the present disclosure provide techniques for operating cache in semiconductor devices, e.g., non-volatile memory devices such as NAND or NOR flash memory devices. The techniques can ensure decreasing operation period (latency) of cache in the memory devices. Instead, the techniques enable the cache of memory devices to decrease the operation cycle by determining in which period the operation command received, to increase the speed of accessing the data in the cache to improve performance of read/write or other operation, and to reduce operation latency as well.

For example, if an operation command is received before end of an operation recovery period, the techniques enable the memory device to start a shorter operation cycle rather than resetting (high) voltage to operate the cache. Moreover, operation currents operated in the memory device can be continuous instead of distinguishing with stand-by current, to decrease interval of cache accessing and reduce latency.

The techniques can be applied to various types of semiconductor devices, e.g., non-volatile memory devices such as NOR flash memory devices, NAND flash memory devices, resistive random-access memory (RRAM) devices, phase-change random-access memory (PCRAM) devices, among others. The techniques can be applied to various memory types, such as SLC (single-level cell) devices, MLC (multi-level cell) devices like 2-level cell devices, TLC (triple-level cell) devices, QLC (quad-level cell) devices, or PLC (penta-level cell) devices. Additionally or alternatively, the techniques can be applied to various types of devices and systems, such as secure digital (SD) cards, embedded multimedia cards (eMMC), or solid-state drives (SSDs), embedded systems, among others. For illustration purposes, in the present disclosure, a memory device is described as an example of a semiconductor device.

Figure 1:
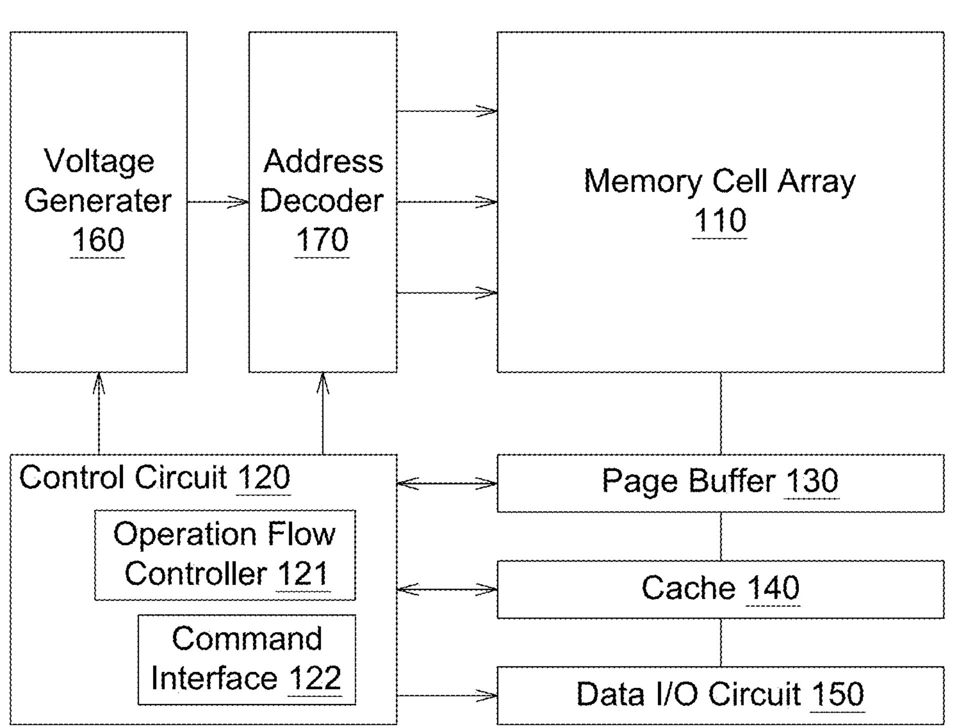
FIG. 1 is a schematic diagram illustrating an example of a memory device, according to one or more embodiments of the present disclosure.

FIG. 1 is a schematic diagram illustrating an example of a memory device 100, according to one or more embodiments of the present disclosure. The memory device 100 can have a memory cell array 110 that can include a number of memory cells. The memory cells can be coupled in series to a number of row word lines and a number of column bit lines. Each memory cell can include a memory transistor configured as a storage element (e.g., a capacitor) to store data. The memory transistor can include a silicon-oxide-nitride-oxide-silicon (SONOS) transistor, a floating gate transistor, a nitride read only memory (NROM) transistor, or any suitable non-volatile memory MOS device that can store charges.

The memory device 100 can include a voltage generator 160 and an address decoder 170. Each memory cell can be coupled to the address decoder 170 via a respective word line. Accordingly, each memory cell can be selected by the address decoder 170 for read or write operations through the respective word line.

The memory device 100 can include a data I/O (input/output) circuit 150 having multiple pins configured to be coupled to an external device. The pins can include SI/SIO0 for serial data input/serial data input & output, SO/SIO1 for serial data output/serial data input &output, SIO2 for serial data input or output, SIO3 for serial data input or output, RESET # for hardware reset pin active low, CS # for chip select, and ECS # for ECC correction signal, and R/B # pin for indicating a ready or busy status of the memory device 100. ECS is abbreviation of Error Correction Code (ECC) Correction Signal. The data I/O circuit 150 can also include one or more other pins, e.g., WP # for write protection active low, and/or Hold # for a holding signal input.

In some implementations, the memory device 100 includes a page buffer 130, a cache 140 and a control circuit 120. The control circuit 120 includes a command interface 122 and an operation flow controller 121, which can generate commands, such as read commands and/or write commands that can be executed respectively to read data from and/or write data to the memory device 100. Data being written to or read from the memory array 110 can be communicated or transmitted between the memory device 100 and the control circuit 120 and/or other components via a data bus (e.g., a system bus), which can be a multi-bit bus. In some implementations, the control circuit 120 receives operation commands of data written or read via the command interface 122 thereof, and determines the time point of receiving operation commands, based on that, wherein the operation flow controller 121 of the control circuit 120 controls the cache. The page buffer 130 and the cache 140 of the memory device 100 are configured to buffer or cache the output or input data from the memory cell array 110 to the data I/O circuit 150.

In some implementations, during a read operation, the memory device 100 receives a read command (or a read instruction) via the control circuit 120, e.g., according to a SPI protocol or a QPI protocol. The read instruction can be transmitted using SDR or DDR. The voltage generator 170 can provide voltage to the address decoder 170 to select memory cells.

In some implementations, after the operation flow controller 121 of the control circuit 120 receiving a first operation command (such as a read command or a read instruction) via the command interface 122, the control circuit 120 controls the memory device 100 to start a first operation cycle including a voltage set period, a first operation set period, a first operation executing period and a first operation recovery period. The operation flow controller 121 controls the cache being at a busy status while starting the voltage set period. During the first operation executing period, the cache 140 receives data, such as receiving data from the page buffer 130 in read operations or from the data I/O circuit 150 in write operations. During the first operation recovery period, the operation flow controller 121 controls the cache switching to the ready status by ending the busy status. In ready status, the data in the cache is accessible, such as the data can be output to the data I/O circuit 150 and/or received from the page buffer 130 in read operations, or the data can be received from the data I/O circuit 150 and/or transferred to the page buffer 130 in write operations.

In some implementations, when the command interface 122 receives a second operation command (such as a read command or a read instruction) before the end of the first operation recovery period, the control circuit 120 controls the memory device 100 to directly start a second operation cycle including a second operation set period, a second operation executing period and a second operation recovery period. Similarly with the first operation cycle, the operation flow controller 121 switches the to the ready status from the busy status while starting the second operation recovery period, and in the ready status, the data in the cache 140 is accessible, such as the data can be output to the data I/O circuit 150 and/or received from the page buffer 130 in read operations, or the data can be received from the data I/O circuit 150 and/or transferred to the page buffer 130 in write operations.

In some implementations, the page buffer 130 can be replaced by a register, for example, when the memory device is a NOR memory device, which the register also can be configured to access data of the cache 140 and the memory cell array 110.

As the discussion above and detailed description as follows, some embodiments of present disclosure provide those technics enabling that the semiconductor device determines timing of receiving operation orders, such as within or after operation recovery period, to decrease time period of operation cycles, such that the speed of accessing the data in the cache is increased to improve performance of read/write or other operation.

For example, if a read command is received before the end of the operation recovery period, the semiconductor device starts a shorter read operation cycle without voltage set period, to achieve higher read performance and reduce read latency.

Figure 2:
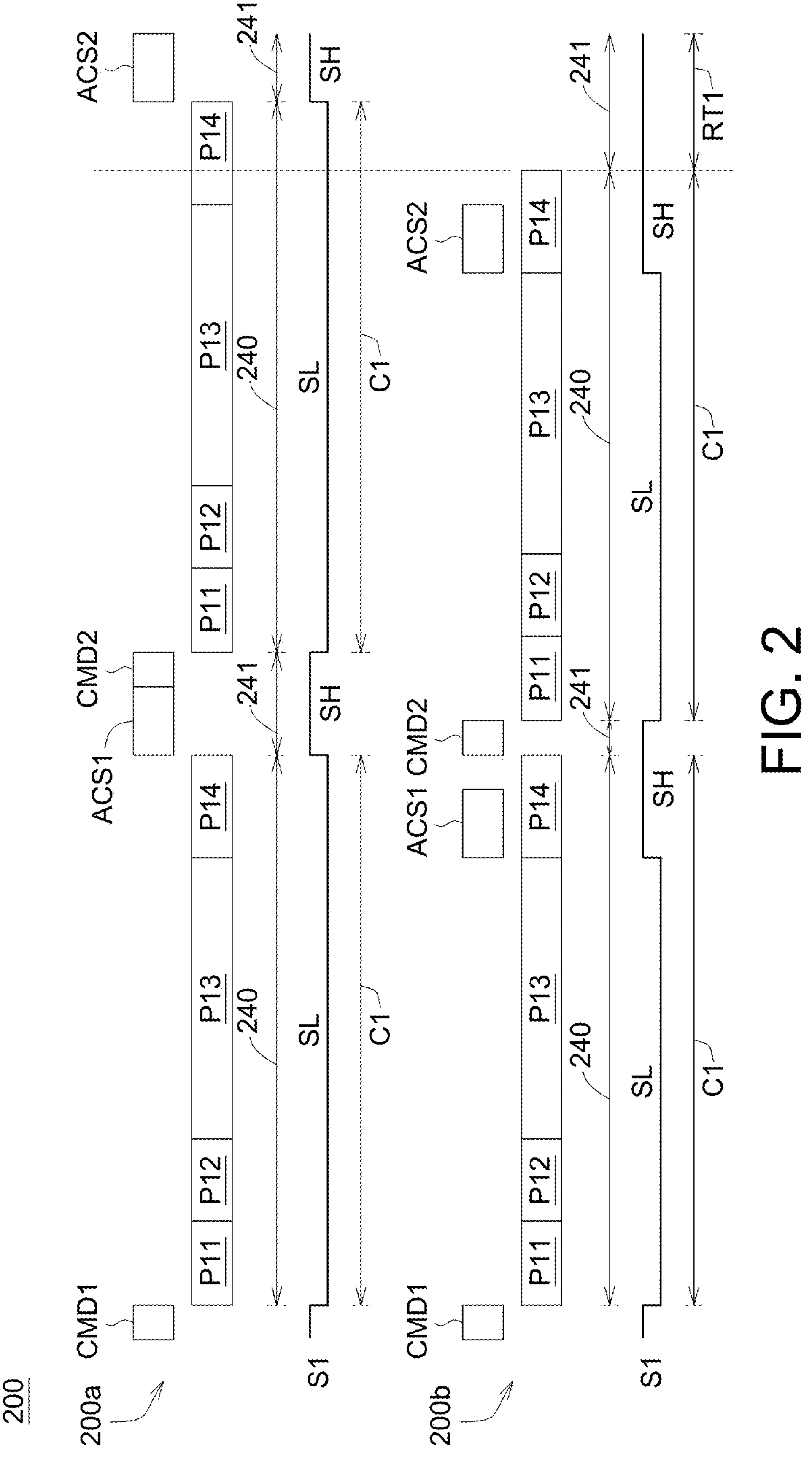
FIG. 2 is a schematic diagram illustrating a timing comparison of various time diagram examples for operations of a memory device, according to one or more embodiments of the present disclosure.

FIG. 2 is a schematic diagram illustrating a timing comparison 200 of various time diagram examples (time diagrams 200*a*, 200*b*) for operations of a memory device, according to one or more embodiments of the present disclosure. Various time diagram examples (time diagrams 200*a*, 200*b*) of FIG. 2 can be applied to a memory device, such as the memory device 100 of FIG. 1. In time diagrams 200*a* and 200*b*, after receiving a first operation command CMD1 (e.g., by the command interface 122 of FIG. 1), the memory device starts a first operation cycle C1 to operate the cache (such as the cache 140 of FIG. 1) of the memory device. The first operation cycle C1, for example, can be operation cycles for executing write or read operation commands. As shown in FIG. 2, the first operation cycle C1 can includes (or distinguished by) a voltage set period P11, a first operation set period P12, a first operation executing period P13 and a first operation recovery period P14.

In time diagrams 200*a* and 200*b*, corresponding to the first operation cycle C1, the cache (such as the cache 140 of FIG. 1) of the memory device corresponds a ready/busy indication signal S1. As shown, the ready/busy indication signal S1 has a first level SH indicating the cache being at a ready status, and a second level SL indicating the cache being at a busy status. The cache is switched to the busy status (e.g., controlled by the operation flow controller 121 of FIG. 1) corresponding to the start of voltage set period p11 of the first operation cycle C1, and at the same time, the ready/busy indication signal S1 is transferred to the second level SL to form a falling edge, which indicates that the cache is switched to the busy status. Then, during the first operation executing period P13, the cache receives data (e.g., from the page buffer 130 or data I/O circuit of FIG. 1).

In time diagrams 200*a* and 200*b*, also corresponding to the first operation cycle C1, the memory device has a first operation current 240 and a stand-by current 241, which the first operation current 240 corresponds to currents through the memory device while operating it, and the stand-by current 241 corresponds to currents through the memory device while the memory device standing by. In some embodiments, the first operation current 240 during operating the memory device is fluctuated and equal to or larger than a preset value. As shown in FIG. 2, the stand-by current corresponds to the gap between two operation cycles (the operation cycle C1 on the right side and the operation cycle C1 on the left side, of FIG. 2), which means that the memory device is at a stand-by status between two first operation cycles.

Referring to the FIG. 2, the difference between time diagrams 200*a* and 200*b* is that data access ACS1 occurs after the end of the first operation recovery period P14 or during the first operation recovery period P14, which the data access ACS1 corresponds to the first operation command CMD1. As shown in the time diagram 200*b*, when the data access ACS1 occurs during the first operation recovery period P14, the gap between two operation cycles can be decreased. In order to set the data access ACS1 occurring during the first operation recovery period P14, which means to access the data in the cache during the first operation recovery period P14, the cache needs to be switched to the ready status (e.g., by the operation flow controller 121 of FIG. 1) correspondingly while starting the first operation recovery period P14, such that the data in the cache is accessible. Corresponding to the ready status of the cache, meanwhile, the ready/busy indication signal S1 is transferred to the first level SH to form a rising edge of the ready/busy indication signal S1 while starting the first operation recovery period P14, as shown in the time diagram 200*b*.

Then, after receiving a second operation command CMD2 (e.g., by the command interface 122 of FIG. 1), the memory device restarts the first operation cycle C1 to operate the cache of the memory device. Similarly, corresponding to the second operation command CMD2, a data access ACS2 also can occur after the end of the first operation recovery period P14 or during the first operation recovery period P14 based on different selections. Comparing the time diagrams 200*a* and 200*b*, by the operation of switching the cache to the ready status while starting the first operation recovery period P14, the data access ACS1 occurs during the first operation recovery period P14, such that a reduced operation time RT1 is obtained after two of operation cycles, as shown in the time diagram 200*b*.

Figure 3:
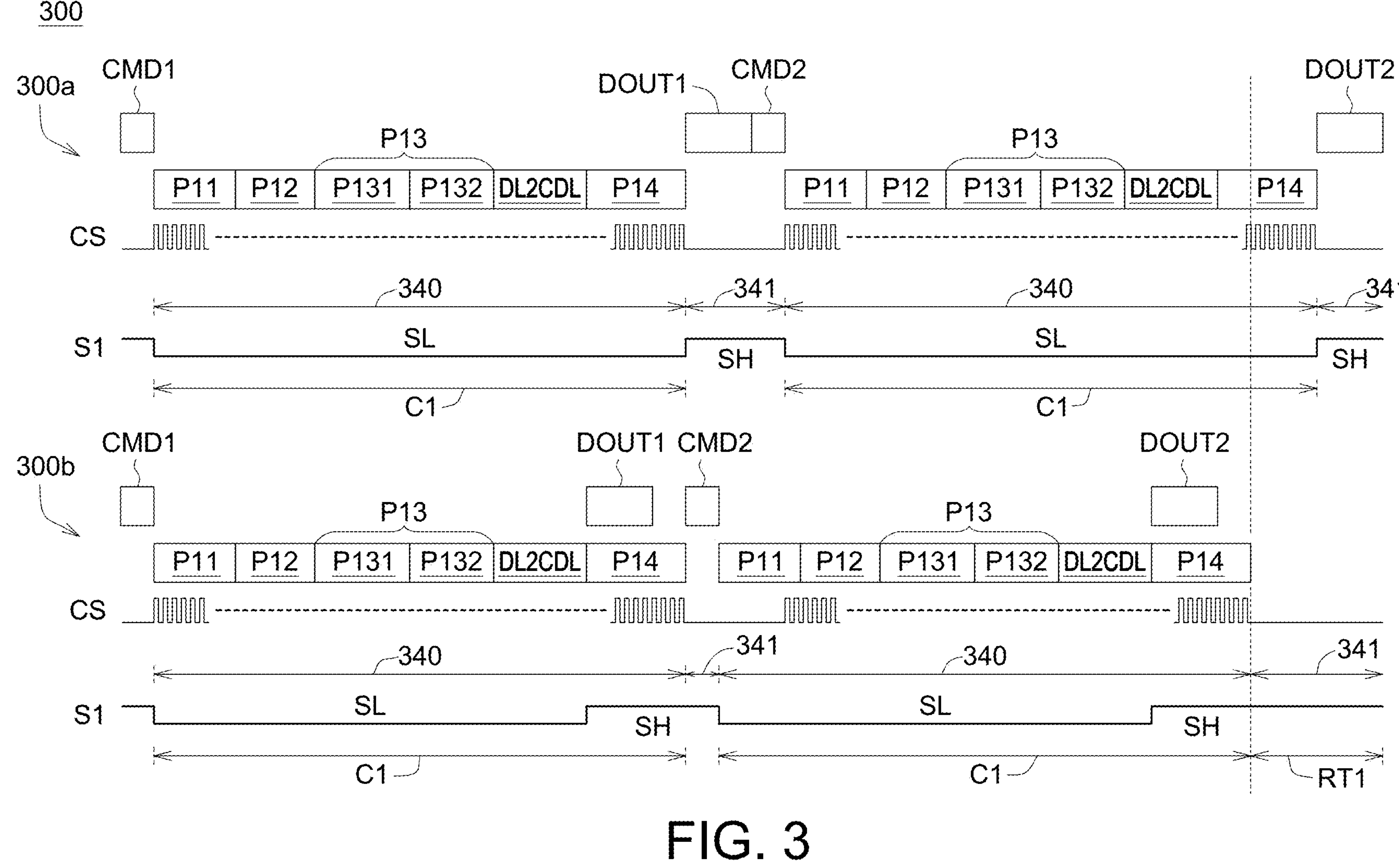
FIG. 3 is a schematic diagram illustrating a timing comparison of various time diagram examples for read operations of a NAND memory device, according to one or more embodiments of the present disclosure.

FIG. 3 is a schematic diagram illustrating a timing comparison 300 of various time diagram examples (time diagrams 300*a* and 300*b*) for read operations of a NAND memory device, according to one or more embodiments of the present disclosure. Similarly with time diagrams 200*a*, 200*b* of FIG. 2, various time diagram examples (time diagrams 300*a*, 300*b*) of FIG. 3 can be applied to a memory device, particularly for, but not limited to, read operations of NAND memory device (such as the memory device 100 of FIG. 1) as an example to be illustrated. As shown in FIG. 3, after receiving the first command CMD1 as a read command (e.g., by the command interface 122 of FIG. 1), the memory device starts the first operation cycle C1 to executing a read operate of the cache (such as the cache 140 of FIG. 1) of the memory device. The first operation cycle C1 is read operation cycle executing a read operation command. The first operation cycle C1 can includes (or distinguished by) a voltage set period P11 (such as high voltage set, HVSET), a first operation set period P12 (such as read set, RSET), a first operation executing period P13 (such as read, RD), a page buffer to cache period DL2CDL (such as page buffer to cache, DL2CDL) and a first operation recovery period P14 (such as read recovery, RREC). The first operation executing period P13 further includes a first read executing period P131 and a second read executing period P132, configured to read the data in the memory cell array (such as the memory cell array 110 of FIG. 1) and transfer the data to the page buffer (such as the page buffer 130 of FIG. 1). In some embodiments, the first operation executing period P13 can include more read executing periods (such as RD1 and RD2 corresponding to tripe-level cell (TLC) device) corresponding to various types of memory devices, for example, at least two read executing periods corresponding to the TLC device, at least three read executing periods corresponding to the quad-level cell (QLC) device or at least four read executing periods corresponding to the penta-level cell (PLC) device and so on. Those read executing periods are configured to read data from the multiple pages of the NAND memory device, such as TLC low page.

Since the NAND memory device generally includes a page buffer (such as the page buffer 130 of FIG. 1), the example herein for read operation of the NAND memory device includes the page buffer to cache period DL2CDL between the first operation executing period P13 and the first operation recovery P14, configured to read data from the page buffer to the cache. The NAND memory has inner clock signal CS to be provided to each periods and respective operations as a reference clock.

Similarly with time diagrams 200*a* and 200*b*, in time diagrams 300*a* and 300*b* of FIG. 3, corresponding to the first operation cycle C1, the cache (such as the cache 140 of FIG. 1) of the memory device corresponds a ready/busy indication signal S1 including the first level SH and the second level SL indicating the cache being at the ready status or the busy status, respectively. The respective relations among the ready/busy indication signal S1 with the first operation cycle C1, and the first operation current 340 and the stand-by current 341 of the memory device of FIG. 3, is similar to the respective relations among the ready/busy indication signal S1 with the first operation cycle C1, and the first operation current 240 and the stand-by current 241 of the memory device of FIG. 2, which would be no further descriptions herein. In some embodiments, the first operation current 340 during operating the NAND memory device (e.g., corresponding to the first operation cycle C1) is fluctuated and equal to or larger than a preset value. For the example of executing the read operation of the NAND memory device, the preset value is 5 mA.

Similarly with the case in the FIG. 2, the difference between time diagrams 300*a* and 300*b* of FIG. 3 is that the data output DOUT1 (corresponding to the data access ACS1 of FIG. 2) occurs after the end of the first operation recovery period P14 or during the first operation recovery period P14. As shown in the time diagram 300*b*, when the data output DOUT1 occurs during the first operation recovery period P14, the gap between two operation cycles can be decreased. Also, in order to set the data output DOUT1 occurring during the first operation recovery period P14, which means to output the data in the cache during the first operation recovery period P14, the cache needs to be switched to the ready status (e.g., by the operation flow controller 121 of FIG. 1) correspondingly while starting the first operation recovery period P14, such that the data in the cache can be output. Corresponding to the ready status of the cache, meanwhile, the ready/busy indication signal S1 is transferred to the first level SH to form a rising edge of the ready/busy indication signal S1 while starting the first operation recovery period P14, as shown in the time diagram 300*b*.

Then, after receiving a second operation command CMD2 (e.g., by the command interface 122 of FIG. 1) as a read command, the memory device restarts the first operation cycle C1 to operate the cache of the memory device. Similarly, corresponding to the second operation command CMD2 as a read command, a data output DOUT2 also can occur after the end of the first operation recovery period P14 or during the first operation recovery period P14 based on different selections. Comparing the time diagrams 300*a* and 300*b*, by the operation of switching the cache to the ready status while starting the first operation recovery period P14, the data output DOUT1 occurs during the first operation recovery period P14, such that the reduced operation time RT1 is obtained after two of operation cycles, as shown in the time diagram 300*b*.

Comparing with the cache switched to the ready status by the end of operation cycles, the foresaid examples for the read operation of the NAND memory device use the technics of switching the cache to the ready status while starting the operation recovery period, such that the data output can be executed during the operation recovery period, reducing the time of read latency. Based on that, technics provided in some embodiments according to the present disclosure, which can further decrease the gap between the operation cycles to further reduce the time of read latency, will be illustrated in detail as follows.

Figure 4:
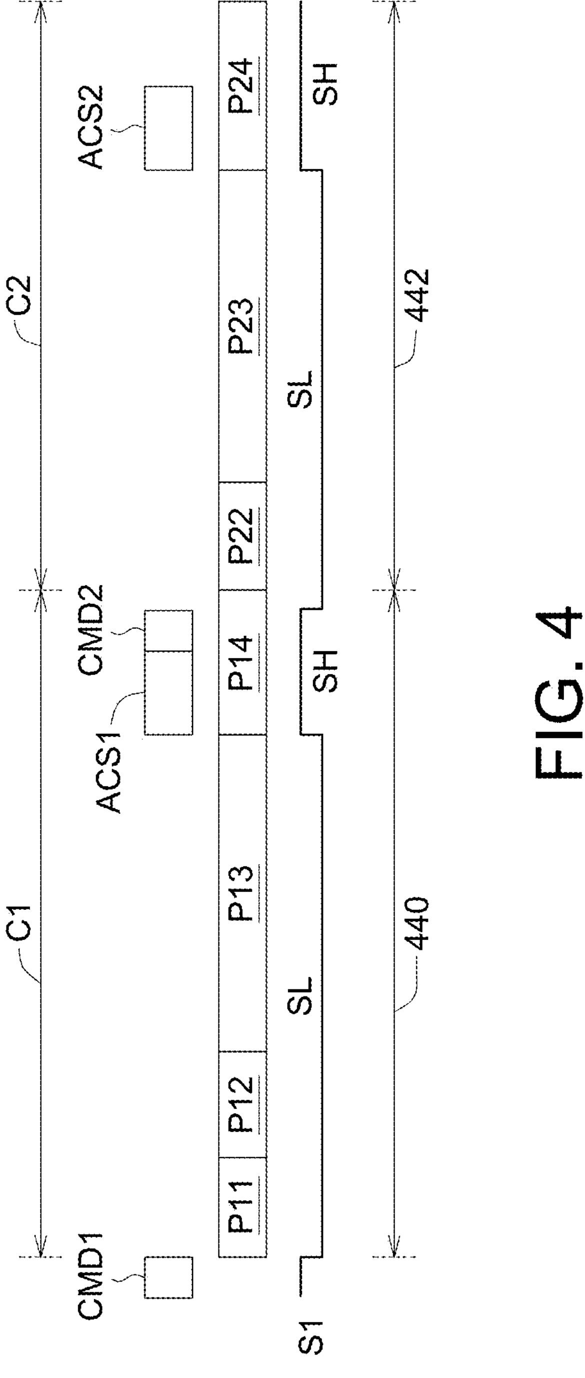
FIG. 4 is a schematic diagram illustrating an example of time diagram for operations of a memory device, according to one or more embodiments of the present disclosure.

FIG. 4 is a schematic diagram illustrating an example of time diagram 400 for operations of a memory device, according to one or more embodiments of the present disclosure. Similarly with the time diagram 200*b* of FIG. 2, in the time diagram 400, after receiving the first operation command CMD1 (e.g., by the command interface 122 of FIG. 1), the memory device starts a first operation cycle C1 to operate the cache (such as the cache 140 of FIG. 1) of the memory device. The first operation cycle C1, for example, can be operation cycles for executing write or read operation commands. The first operation cycle C1 also can includes (or distinguished by) a voltage set period P11, a first operation set period P12, a first operation executing period P13 and a first operation recovery period P14.

Similarly with the time diagram 200*b* of FIG. 2, in the time diagram 400, corresponding to the first operation cycle C1, the cache (such as the cache 140 of FIG. 1) of the memory device corresponds the ready/busy indication signal S1 including the first level SH and the second level SL indicating the cache being at the ready status or the busy status. The time period of the first operation current 440 corresponds to the time period of the first operation cycle C1.

Similarly with the time diagram 200*b* of FIG. 2, in the time diagram 400 of FIG. 4, in order to set the data access ACS1 which corresponding to the first operation command CMD1, occurring during the first operation recovery period P14, the cache is switched to the ready status (e.g., by the operation flow controller 121 of FIG. 1) correspondingly while starting the first operation recovery period P14, such that the data in the cache is accessible. Differently with the time diagram 200*b* of FIG. 2, in the example of the time diagram 400 of FIG. 4, to further decrease the gap between operation cycles, the second command CMD2 can be input to the memory device before the end of the first operation recovery period P14. In this case, the cache is switched to the busy status after the memory device receiving the second command CMD2, and correspondingly the ready/busy indication signal S1 is transferred from the first level SH to the second level SL, which the ready/busy indication signal S1 has a falling edge by the end of the second command CMD2, as shown in FIG. 4.

Then, after the end of the first operation recovery period P14, the memory device directly starts a second operation cycle C2, which includes (or distinguished by) a second operation set period P22, a second operation executing period P23 and a second operation recovery period P24. The time period of a second operation current 442 of the memory device corresponds to the time period of the second operation cycle C2. Differently with the first operation cycle C1, the second operation cycle C2 does not include voltage set period P11. It can be understood that the time period of the second operation cycle C2 is shorter than the time period of the first operation cycle C1. Since the memory device starts the second operation cycle directly after the end of the first operation recovery period P14, there is no gap between the first operation cycle C1 and the second operation cycle C2, which means that the first operation recovery period P14 is adjacent to the second operation set period P22. Thus, the first operation current 440 and the second operation current 442 corresponding to the first operation cycle C1 and the second operation cycle C2 respectively, are adjacent to each other, between which there are no stand-by current. In this operation, the second operation cycle c2 can exclude the voltage set period to start respective operation for the specified operation command, rather than setting voltage by the start of the operation cycle. Since a falling edge of a ready/busy indication signal S1 corresponds to the end of the second read command CMD2 during the first operation recovery period P14, the first operation current 440 still occurs in the gap between the falling edge of ready/busy indication signal S1 and the end of the first operation recovery period P14. Correspondingly, the time period of the second operation current 442 is shorter than the time period of the first operation current 440. In some embodiments, the first operation current 440 and the second operation current 442 during operating the memory device (e.g., corresponding to the first operation cycle C1 and the second operation cycle C2) are fluctuated and are equal to and larger than a preset value.

In the second operation cycle C2, the cache is switched from the busy status to the ready status while starting the second operation recovery period P24, such that the data in the cache is accessible (such as the data access ACS2 of FIG. 4), and correspondingly the ready/busy indication signal S1 is transferred from the second level SL to the first level SH, which has a rising edge by the start of the second operation recovery period P24. Similarly, corresponding to the second operation command CMD2, the data access ACS2 also can occur after the end of the first operation recovery period P14 or during the first operation recovery period P14 based on different selections.

In the examples above, the technics provided according to the present disclosure can set the memory starting the first operation cycle after the end of the second command, or the second operation cycle after the end of the first operation recovery period, based on the time point of receiving the second operation command (by determining that the time point is before the end of the first operation recovery period or during the first operation recovery period). To further explain the process of the technic, the description is referred to the FIG. 5 as follows.

Figure 5:
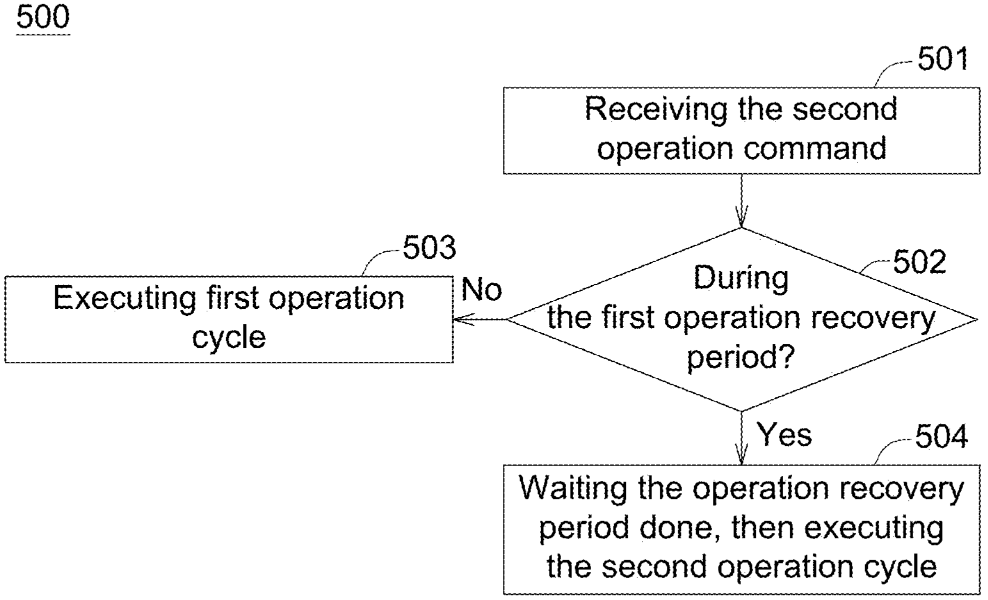
FIG. 5 is a flow chart of the process of the example of time diagram of FIG. 4.

FIG. 5 is a flow chart of the process 500 of the example of time diagram 400 of FIG. As shown in FIG. 5, in step 501, the memory device receives the second command, then followed by the step 502. In step 502, the determination of whether the time point of receiving second command is during the first operation recovery period or not. If no, start the step 503 to executing the first operation cycle (as shown in the time diagram 200*b* of the FIG. 2), or, if yes, start the step 504 of waiting the operation recovery period done then executing the second operation cycle (as shown in the time diagram 400 of the FIG. 4).

Figure 6:
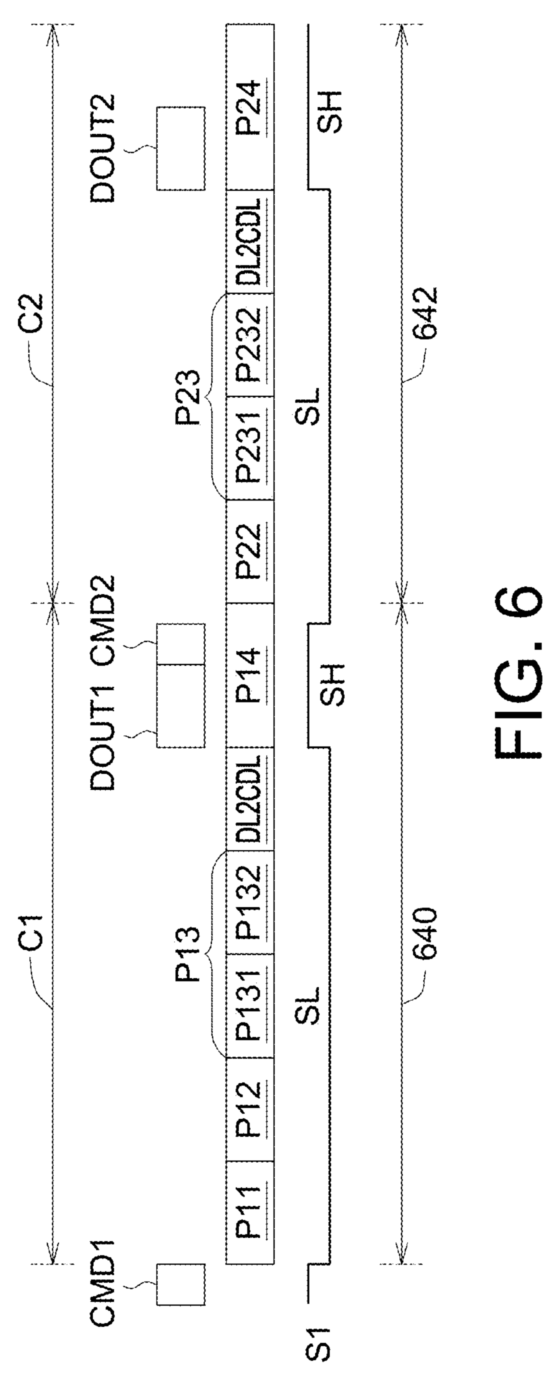
FIG. 6 is a schematic diagram illustrating an example of time diagram for read operations of a NAND memory device, according to one or more embodiments of the present disclosure.

FIG. 6 is a schematic diagram illustrating an example of time diagram 600 for read operations of a NAND memory device, according to one or more embodiments of the present disclosure. Similarly with the time diagram 300*b* of FIG. 3, the time diagram 600 of FIG. 6 can be applied to a memory device, particularly for, but not limited to, read operations of NAND memory device (such as the memory device 100 of FIG. 1) as an example to be illustrated. As shown in FIG. 6, after receiving the first command CMD1 as a read command (e.g., by the command interface 122 of FIG. 1), the memory device starts the first operation cycle C1 to executing a read operate of the cache (such as the cache 140 of FIG. 1) of the memory device. The first operation cycle C1 is read operation cycle executing a read operation command. As shown in FIG. 6, the first operation cycle C1 can includes (or distinguished by) a voltage set period P11 (such as high voltage set, HVSET), a first operation set period P12 (such as read set, RSET), a first operation executing period P13 (such as read, RD), a page buffer to cache period DL2CDL (such as page buffer to cache, DL2CDL) and a first operation recovery period P14 (such as read recovery, RREC). The first operation executing period P13 further includes a first read executing period P131 and a second read executing period P132, configured to read the data in the memory cell array (such as the memory cell array 110 of FIG. 1) and transfer the data to the page buffer (such as the page buffer 130 of FIG. 1). In some embodiments, the first operation executing period P13 can include more read executing periods (such as RD1 and RD2 corresponding to tripe-level cell (TLC) device) corresponding to various types of memory devices, for example, at least two read executing periods corresponding to the TLC device, at least three read executing periods corresponding to the quad-level cell (QLC) device or at least four read executing periods corresponding to the penta-level cell (PLC) device and so on. Those read executing periods are configured to read data from the multiple pages of the NAND memory device, such as TLC low page.

Since the NAND memory device generally includes a page buffer (such as the page buffer 130 of FIG. 1), the example herein for read operation of the NAND memory device includes the page buffer to cache period DL2CDL between the first operation executing period P13 and the first operation recovery P14, configured to read data from the page buffer to the cache. The NAND memory has inner clock signal CS to be provided to each periods and respective operations as a reference clock.

Similarly with time diagrams 400 of the FIG. 4, in time diagram 600 of FIG. 6, corresponding to the first operation cycle C1, the cache (such as the cache 140 of FIG. 1) of the memory device corresponds a ready/busy indication signal S1 including the first level SH and the second level SL indicating the cache being at the ready status or the busy status, respectively. The respective relations among the ready/busy indication signal S1 with the first operation cycle C1, the second operation cycle C2, and the first operation current 640 and the second operation current 642 of the memory device of FIG. 6, is similar to the respective relations among the ready/busy indication signal S1 with the first operation cycle C1, the second operation cycle C2, and the first operation current 440 and the second operation current 442 of the memory device of FIG. 4, which would be no further descriptions herein.

Similarly with the time diagram 400 of FIG. 4, in the time diagram 600 of FIG. 6, in order to set the data output DOUT1 which corresponding to the first operation command CMD1, occurring during the first operation recovery period P14, the cache is switched to the ready status (e.g., by the operation flow controller 121 of FIG. 1) correspondingly while starting the first operation recovery period P14, such that the data in the cache can be output. Also, to further decrease the gap between operation cycles (such as the first operation cycle C1 and the second operation cycle C2), the second command CMD2 can be input to the NAND memory device before the end of the first operation recovery period P14. In this case, the cache is switched to the busy status after the memory device receiving the second command CMD2, and correspondingly the ready/busy indication signal S1 is transferred from the first level SH to the second level SL, which the ready/busy indication signal S1 has a falling edge by the end of the second command CMD2, as shown in FIG. 6.

Then, after the end of the first operation recovery period P14, the memory device directly starts a second operation cycle C2. Similarly with the first operation cycle C1, the second operation cycle C2 includes (or distinguished by) a second operation set period P22 (such as read set, RSET), a second operation executing period P23 (such as read, RD), a page buffer to cache period DL2CDL (such as page buffer to cache, DL2CDL) and a second operation recovery period P24 (such as read recovery, RREC). The time period of a second operation current 642 of the NAND memory device corresponds to the time period of the second operation cycle C2. The second operation executing period P23 further includes a third read executing period P231 and a fourth read executing period P232, configured to read the data in the memory cell array (such as the memory cell array 110 of FIG. 1) and transfer the data to the page buffer (such as the page buffer 130 of FIG. 1). Similar with the first operation cycle C1, the second operation executing period P23 of the second operation cycle C2 can include more read executing periods (such as RD1 and RD2 corresponding to tripe-level cell (TLC) device) corresponding to various types of memory devices, for example, at least two read executing periods corresponding to the TLC device, at least three read executing periods corresponding to the quad-level cell (QLC) device or at least four read executing periods corresponding to the penta-level cell (PLC) device and so on. Those read executing periods are configured to read data from the multiple pages of the NAND memory device, such as TLC low page.

Also, Since the NAND memory device generally includes a page buffer (such as the page buffer 130 of FIG. 1), the example herein for read operation of the NAND memory device includes the page buffer to cache period DL2CDL between the second operation executing period P23 and the second operation recovery P24, configured to read data from the page buffer to the cache.

Differently with the first operation cycle C1, the second operation cycle C2 does not include voltage set period P11. It can be understood that the time period of the second operation cycle C2 is shorter than the time period of the first operation cycle C1. Since the memory device starts the second operation cycle directly after the end of the first operation recovery period P14, there is no gap between the first operation cycle C1 and the second operation cycle C2, which means that the first operation recovery period P14 is adjacent to the second operation set period P22. Thus, the first operation current 640 and the second operation current 642 corresponding to the first operation cycle C1 and the second operation cycle C2, are adjacent to each other, between which there are no stand-by current. In this operation, the second operation cycle c2 can exclude the voltage set period to start respective operation for the specified operation command, rather than setting voltage by the start of the operation cycle. Correspondingly, the time period of the second operation current 642 is shorter than the time period of the first operation current 640. In some embodiments, the first operation current 640 and the second operation current 642 during operating the memory device (e.g., corresponding to the first operation cycle C1 and the second operation cycle C2) are fluctuated and are equal to and larger than a preset value. For the example of executing the read operation of the NAND memory device, the preset value is 5 mA. Since a falling edge of a ready/busy indication signal S1 corresponds to the end of the second operation command CMD2 during the first operation recovery period P14, such that the first operation current 640 still occurs in a gap between the falling edge of ready/busy indication signal S1 and the end of the first operation recovery period P14, which means that the first operation current 640 which is equal to or larger than the preset value, 5 mA, occurs in the gap between the falling edge of ready/busy indication signal S1 and the end of the first operation recovery period P14, rather than the stand-by value (such as time diagrams 300*a* and 300*b* of FIG. 3).

In the second operation cycle C2, the cache is switched from the busy status to the ready status while starting the second operation recovery period P24, such that the data in the cache can be output, and correspondingly the ready/busy indication signal S1 is transferred from the second level SL to the first level SH, which has a rising edge by the start of the second operation recovery period P24. Similarly, corresponding to the second operation command CMD2, the data output DOUT2 also can occur after the end of the first operation recovery period P24 or during the first operation recovery period P24 based on different selections.

It can be understood that, although not shown in the FIGs, according to the technics provided by the present disclosure, in the second operation cycle C2, if the memory device receives the next operation command before the end of the second operation recovery period p24, the second operation cycle C2 will start after the end of the second operation recovery period p24; if the next operation command is received after the end of the second operation recovery period P24, the first operation cycle C2 will start after receiving the next operation command. The components of the memory device execute the respective functions based to the foresaid relations, which would be no further descriptions herein.

Figure 7:
FIG. 7 is a schematic diagram illustrating a timing comparison of various time diagram examples for read operations of a NAND memory device of FIGS. 3 and 6.

FIG. 7 is a schematic diagram illustrating a timing comparison 700 of various time diagram examples (time diagrams 700*a*, 700*b* and 700*c*) for read operations of a NAND memory device of FIGS. 3 and 6. Similarly with the time diagrams 300*a* and 300*b* of FIG. 3, and the time diagram 600 of FIG. 6, time diagrams 700*a*, 700*b* and 700*c* of FIG. 7 can be applied to a memory device, particularly for, but not limited to, read operations of NAND memory device (such as the memory device 100 of FIG. 1) as an example to be illustrated. As shown in FIG. 7, in time diagrams 700*a* (similar to the time diagram 300*a* of FIG. 3), 700*b* (similar to the time diagram 300*b* of FIG. 3) and 700*c* (similar to the time diagram 600 of FIG. 6), because of the differences between time points of switching the busy status of the cache to the ready status (such as the rising edge of the ready/busy indication signal S1 switched from the second level SL to the first level SH, corresponding to the end of the first recovery period P14, in time diagram 700*a*, and that of, and the time the ready/busy indication signal S1 corresponding to the start of the first recovery period P14 in time diagrams 700*b* and 700*c*), and between the time points of the second operation command CMD2 received (such as in time diagrams 700*a* and 700*b*, the second operation command CMD received after the end of the first recovery period P14, and in time diagram 700*c*, the second operation command CMD received during the first recovery period P14), the necessary time period of executing two operation cycles (such as two first operation cycles C1 in time diagrams 700*a* and 700*b*, and first operation cycle C1 and second operation cycles C2 in time diagram 700*c*) are different. As shown, in this example for read operation of the NAND memory device, comparing with the time diagram 700*a*, the time diagram 700*c* has a reduced operation time RT1, and the time diagram 700*c* has a reduced operation time RT2. The reduced operation time RT2 is greater than the reduce operation time RT1, which means that, in time diagram 700*c*, more read operation time is reduced, which also decreases the read latency of the memory device.

In some embodiments, the first operation command (such as the first operation command CMD1 of FIGS. 2 and 4) and the second operation command (such as the second operation command CMD2 of FIGS. 2 and 4) received by the memory device, can be a write command, such that the memory device can also reduce the latency of write operation (e.g., using the first operation cycle C1 or the second operation cycle C2 of FIG. 4) based on time points of receiving write commands (such as after the end of the operation recovery period or during the operation recovery period). In some embodiments, the first operation command and the second operation command received by the memory device, can be write command or read command, respectively, and the order of write commands or read commands can be rearranged, such that the memory device can also reduce the latency of write or read operation (e.g., using the first operation cycle C1 or the second operation cycle C2 of FIG. 4) based on time points of receiving write or read commands (such as after the end of the operation recovery period or during the operation recovery period).

According to the embodiments and examples above, the technics provided by the present disclosure can reduce the latency of access operation for the memory device by using different operation cycles, based on the demands or specified operation commands and determination of time points of receiving operation commands.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. An operation method for a memory device, the operation method comprising:

starting a first operation cycle in the memory device after the memory device receiving a first operation command, the first operation cycle including a voltage set period, a first operation set period, a first operation executing period and a first operation recovery period;

switching to a busy status of a cache while starting the voltage set period;

receiving data by the cache in the first operation period; and switching to a ready status from the busy status of the cache while starting the first operation recovery period, such that data in the cache is accessible during the ready status;

wherein when a second operation command is received by the memory device before an end of the first operation recovery period, the memory device starts a second operation cycle directly after the end of the first operation recovery period, which the second operation cycle includes a second operation set period, a second operation executing period and a second operation recovery period, and the second operation set period is adjacent to the first operation recovery period;

wherein the busy status of the cache is switched to the ready status from the busy status while starting the second operation recovery period, such that data in the cache is accessible, wherein when the second operation command is received after the end of the first operation recovery period, the memory device restarts the first operation cycle after receiving the second operation command and the cache is switched to the busy status, wherein a period of the second operation cycle is shorter than a period of the first operation cycle, wherein the cache corresponds to a ready/busy indication signal including a first level indicating the ready status of the cache and a second level indicating the busy status of the cache, wherein falling edges from the first level switching to the second level of the ready/busy indication signal corresponds to a start of the voltage set period and the end of the first operation command, or corresponds to an end of the second operation command during the first operation recovery period, and rising edges from the second level switching to the first level of the ready/busy indication signal corresponds to a start of the first operation recovery period and a start of the second operation recovery period.

2. The operation method of claim 1, wherein a time period of a first operation current of the memory device corresponds to the time period of the first operation cycle;

wherein when the second operation command is received before the end of the first operation recovery period, a time period of a stand-by current of the memory device corresponds to a time period between the end of the first operation recovery period and the end of the second operation command;

wherein the time period between two adjacent falling edges of the ready/busy indication signal corresponds to the sum of time periods of the first operation current and the stand-by current of the memory device.

3. The operation method of claim 2, wherein when the second operation command is received before the end of the first operation recovery period, the cache switches to the busy status after receiving the second operation command;

wherein a time period of a second operation current of the memory device corresponds to the time period of the second operation cycle, and a falling edge of the ready/busy indication signal corresponds the end of the second operation command during the first operation recovery period, such that the time period between the two adjacent falling edges of the ready/busy indication signal is shorter than the time period of the first operation current of the memory device.

4. The operation method of claim 1, wherein the memory device is a NAND memory device including a page buffer, and the first operation cycle further includes a first page buffer to cache period between the first operation executing period and the first operation recovery period, which the first page buffer to cache period is configured to operate data transferring between the page buffer and the cache.

5. The operation method of claim 4, wherein the NAND memory device includes a memory cell array, and the first operation command includes a first read command;

wherein the first operation executing period at least includes a first read executing period and a second read executing period configured to respectively read data from the memory cell array to the page buffer, and data of the cache is output during the first operation recovery period.

6. The operation method of claim 4, wherein the NAND memory device includes a memory cell array, and the second operation command includes a second read command;

wherein the second operation cycle further includes a second page buffer to cache period between the second operation executing period and the second operation recovery period, which the second page buffer to cache period is configured to operate data transferring between the page buffer and the cache of the NAND memory device.

7. The operation method of claim 6, wherein the second operation executing period at least includes a third read executing period and a fourth read executing period configured to respectively read data from the memory cell array to the page buffer, and data of the cache is output during the second operation recovery period.

8. The operation method of claim 6, wherein a time period of a first operation current of the NAND memory device corresponds to the time period of the first operation cycle;

wherein when the second read command is received before the end of the first operation recovery period, one of the falling edges of the ready/busy indication signal corresponds to the end of the second read command during the first operation recovery period, such that the first operation current still occurs in a gap between the falling edge of the ready/busy indication signal and the end of the first operation recovery period, wherein the first operation current is equal to or larger than a preset value.

9. The operation method of claim 1, wherein the memory device is a NOR memory device including a register, and the first operation command includes a first read command;

wherein the first operation executing period is configured to read data from the register to the cache of the NOR memory device and data in the cache outputs during the first operation recovery period.

10. The operation method of claim 1, wherein the memory device is a NOR memory device including a register, and the second operation command includes a second read command;

wherein the second operation executing period is configured to read data from the register to the cache of the NOR memory device and data in the cache outputs during the second operation recovery period.

11. The operation method of claim 1, wherein the first operation command includes a first write command and data in the cache is written into the memory device during the first operation recovery period;

wherein the second operation command includes a second write command and data in the cache is written into the memory device during the second operation recovery period.

12. The memory device, comprising:

a memory cell array configured to store data;

a control circuit coupled to the memory cell array, the control circuit including a command interface and an operation flow controller; and a cache coupled to the memory cell array and the control circuit;

wherein after the control circuit receiving a first operation command via the command interface, the control circuit control the memory device starting a first operation cycle including a first voltage set period, a first operation set period, a first operation executing period and a first operation recovery period;

wherein the operation flow controller controls the cache to operate the following procedures:

switching to a busy status of the cache while starting the voltage set period;

receiving data by the cache in the first operation period; and switching to a ready status from the busy status of the cache while starting the first operation recovery period, such that data in the cache is accessible during the ready status;

wherein when the second operation command is received by the command interface before an end of the first operation recovery period, the control circuit controls the memory device to start a second operation cycle directly after the end of the first operation recovery period, which the second operation cycle includes a second operation set period, a second operation executing period and a second operation recovery period, and the second operation set period is adjacent to the first operation recovery period;

wherein the busy status of the cache is switched to the ready status from the busy status by the operation flow controller while starting the second operation recovery period, such that data in the cache is accessible, wherein when the second operation command is received after the end of the first operation recovery period, the control circuit controls the memory device to restart the first operation cycle after receiving the second operation command and the cache is switched to the busy status, wherein a period of the second operation cycle is shorter than a period of the first operation cycle, wherein the cache corresponds to a ready/busy indication signal including a first level indicating the ready status of the cache and a second level indicating the busy status of the cache, wherein falling edges from the first level switching to the second level of the ready/busy indication signal corresponds to a start of the voltage set period and the end of the first operation command, or corresponds to an end of the second operation command during the first operation recovery period, and rising edges from the second level switching to the first level of the ready/busy indication signal corresponds to a start of the first operation recovery period and a start of the second operation recovery period.

13. The memory device of claim 12, wherein the memory device is a NAND memory device further comprises:

a page buffer coupled between the memory cell array and the cache; and a data I/O (input/output) circuit coupled to the cache;

wherein the first operation command includes a first read command.

14. The memory device of claim 13, wherein the first operation cycle further includes a first page buffer to cache period between the first operation executing period and the first operation recovery period, which the first page buffer to cache period is configured to operate data transferring between the page buffer and the cache.

15. The memory device of claim 14, wherein the first operation executing period at least includes a first read executing period and a second read executing period configured to respectively read data from the memory cell array to the page buffer, and data of the cache is output to the data I/O circuit during the first operation recovery period.

16. The memory device of claim 13, wherein the second operation command includes a second read command;

wherein the second operation cycle further includes a second page buffer to cache period between the second operation executing period and the second operation recovery period, which the second page buffer to cache period is configured to operate data transferring between the page buffer and the cache.

17. The memory device of claim 16, wherein the second operation executing period at least includes a third read executing period and a fourth read executing configured to respectively read data from the memory cell array to the page buffer, and data of the cache is output to the data I/O circuit during the second operation recovery period.

18. The memory device of claim 14, wherein a time period of a first operation current of the NAND memory device corresponds to the time period of the first operation cycle;

wherein when the second read command is received before the end of the first operation recovery period, a falling edge of the ready/busy indication signal corresponds to the end of the second read command during the first operation recovery period, such that the first operation current still occurs in a gap between the falling edge of the ready/busy indication signal and the end of the first operation recovery period, wherein the first operation current is equal to or larger than a preset value.

* * * * *